United States Patent
Brizard et al.

(10) Patent No.: US 9,969,470 B2
(45) Date of Patent: *May 15, 2018

(54) DEPLOYMENT AND RECOVERY OF AUTONOMOUS UNDERWATER VEHICLES FOR SEISMIC SURVEY

(75) Inventors: Thierry Brizard, Massy (FR); Alice Hervé, Paris (FR); Erwan Postic, Jakarta (ID); Peter Maxwell, Missouri City, TX (US); Robert Dowle, Massy (FR); Salvador Rodriguez, Chaville (FR)

(73) Assignee: CGG SERVICES SAS, Massy (FR)

( * ) Notice: Subject to any disclaimer, the term of this patent is extended or adjusted under 35 U.S.C. 154(b) by 1500 days.

This patent is subject to a terminal disclaimer.

(21) Appl. No.: 13/616,396

(22) Filed: Sep. 14, 2012

(65) Prior Publication Data
US 2013/0083623 A1 Apr. 4, 2013

Related U.S. Application Data

(60) Provisional application No. 61/541,203, filed on Sep. 30, 2011.

(51) Int. Cl.
*G01V 1/38* (2006.01)
*B63C 11/42* (2006.01)

(52) U.S. Cl.
CPC .......... *B63C 11/42* (2013.01); *G01V 1/3852* (2013.01)

(58) Field of Classification Search
None
See application file for complete search history.

(56) References Cited

U.S. PATENT DOCUMENTS 5,253,605 A 10/1993 Collins
5,447,115 A * 9/1995 Moody ............... B63C 7/00
114/312
5,894,450 A * 4/1999 Schmidt et al. ........... 367/134
(Continued)

FOREIGN PATENT DOCUMENTS

CN 102213594 A 10/2011
EP 1217390 A1 6/2002
(Continued)

OTHER PUBLICATIONS

Dragoset. (2005). A historical reflection on reflections (in SEG; 75; Imaging the past, present, and future; Society of Exploration Geophysicists 1930-2005) Leading Edge (Tulsa, OK), 24, Suppl. :S46-S71.*

(Continued)

*Primary Examiner* — Isam A Alsomiri
*Assistant Examiner* — Jonathan D Armstrong
(74) *Attorney, Agent, or Firm* — Patent Portfolio Builders PLLC

(57) ABSTRACT

A system and method for performing a marine seismic survey of a subsurface. The method includes deploying under water, from a deploying vessel, an autonomous underwater vehicle (AUV); recording with seismic sensors located on the AUV seismic waves generated by an acoustic source array; instructing the AUV to surface at a certain depth relative to the water surface; recovering the AUV by bringing the AUV on a recovery vessel; and transferring recorded seismic data to the recovery vessel.

20 Claims, 13 Drawing Sheets

(56) References Cited

U.S. PATENT DOCUMENTS

| | | | |
|---|---|---|---|
| 6,390,012 | B1 | 5/2002 | Watt et al. |
| 6,474,254 | B1* | 11/2002 | Ambs et al. ............... 114/312 |
| 6,502,527 | B1* | 1/2003 | Danielson ............... B63G 8/32 |
| | | | 114/312 |
| 6,625,083 | B2 | 9/2003 | Vandenbroucke |
| 6,779,475 | B1 | 8/2004 | Crane et al. |
| 6,932,185 | B2 | 8/2005 | Bary et al. |
| 6,951,138 | B1 | 10/2005 | Jones |
| 7,252,046 | B1 | 8/2007 | Ead et al. |
| 7,646,670 | B2 | 1/2010 | Maxwell et al. |
| 7,796,466 | B2 | 9/2010 | Combee et al. |
| 8,096,254 | B1 | 1/2012 | Bauer et al. |
| 8,109,223 | B2 | 2/2012 | Jamieson |
| 8,881,665 | B2 | 11/2014 | Brizard et al. |
| 2006/0054074 | A1* | 3/2006 | Wingett ............... B63B 22/18 |
| | | | 114/312 |
| 2008/0202405 | A1* | 8/2008 | Kern ............... B63B 23/30 |
| | | | 114/259 |
| 2008/0302292 | A1* | 12/2008 | Ruggaber ............... B63C 7/16 |
| | | | 114/322 |
| 2010/0000459 | A1* | 1/2010 | Colangelo ............... 114/259 |
| 2010/0157727 | A1 | 6/2010 | Woodard, Jr. et al. |
| 2010/0182870 | A1 | 7/2010 | Norris et al. |
| 2010/0302901 | A1 | 12/2010 | Welker et al. |
| 2011/0297121 | A1 | 12/2011 | Kraus et al. |
| 2012/0069702 | A1 | 3/2012 | Muyzert et al. |
| 2013/0014686 | A1* | 1/2013 | Alden ............... B63B 27/36 |
| | | | 114/259 |
| 2013/0025521 | A1* | 1/2013 | Soreau ............... B63B 23/32 |
| | | | 114/259 |

FOREIGN PATENT DOCUMENTS

| | | |
|---|---|---|
| EP | 1319964 A2 | 6/2003 |
| FR | 2991764 A1 * 12/2013 ............... F41F 3/10 |
| WO | 01/73477 A2 | 10/2001 |
| WO | 02/37140 A2 | 5/2002 |
| WO | 2011/106237 A2 | 9/2011 |
| WO | 2012/013171 A1 | 2/2012 |
| WO | 2012/013962 A1 | 2/2012 |

OTHER PUBLICATIONS

Williams, T.M. (1992). Heuristic Scheduling of Ship Replenishment at Sea. The Journal of the Operational Research Society, vol. 43, No. 1 (Jan. 1992), pp. 11-18. Palgrave Macmillan Journals Operational Research Society. Stable URL: http://www.jstor.org/stable/2583694. Accessed: Apr. 15, 2015 17:46 UTC.*

U.S. Office Action dated Mar. 18, 2014, in related U.S. Appl. No. 13/616,327.

D. R. Yoerger, et al.; "Fine-scale seafloor survey in rugged deep-ocean terrain with an autonomous robot"; Robotics and Automation 2000, Proceedings, ICRA, International Conference on Apr. 24-28, 2000; Abstract; vol. 2; IEEE Eplore Digital Library; ISBN 0-7803-5886-4; Aug. 6, 2002; San Francisco, CA.

Rhonda Duey; "'Flying' Nodes Shift Marine Seismic Paradigm"; Dec. 1, 2011; pp. 1-2; [downloaded on Feb. 28, 2012 http://www.epmag.com/item/print/Flying-Nodes-Shift-Marine-Seismic-Paradigm-92689].

Tadahiro Hyakudome; "Design of Autonomous Underwater Vehicle"; Japan Agency for Marine-Earth Science and Technology (JAMSTEC), Japan; International Journal of Advanced Robotic Systems; vol. 8, No. 1 (2011) ISSN 1729-8806; pp. 122-130; [downloaded from http://www.intechopen.com/journals/international_journal_of advanced_robotic_systems/design-of-autonomous-underwater-vehicle].

Hiroshi Yoshida, et al.; "New Attempts in the MR-X1 Sea-Trials: The Working AUV Tries to Survey of the Sea Floor and to Take Mud Samples"; Paper No. OMAE2010-20347; ASME 2010 9th International Conference on Ocean, Offshore and Arctic Engineering (MAE2010); Abstract; Jun. 6-11, 2010; Shanghai, China; [downloaded Feb. 28, 2012 at http://dx.doi.org/10.1115/OMAE2010-20347].

International Search Report in corresponding International Application No. PCT/EP2012/069144 dated Feb. 4, 2013.

Written Opinion in corresponding International Application No. PCT/EP2012/069144 dated Feb. 4, 2013.

International Search Report in corresponding International Application No. PCT/EP2012/069145 dated Feb. 6, 2013.

Written Opinion in corresponding International Application No. PCT/EP2012/069145 dated Feb. 6, 2013.

Communication pursuant to Article 94(3) EPC in related European Application No. 12766960.4, dated Sep. 16, 2015 (all documents cited are already of record with the USPTO).

Third Party Observation in European Application No. EP20120775648 dated Apr. 20, 2017. (Reference WO2011/106237A2 was made of record in an Information Disclosure Statement submitted on Sep. 14, 2012.).

L. Amundsen, et al.; "Seismic Imaging Technology Part IV"; GEP ExPro, Seismic Imaging Technology Part IV; [downloaded at http://geoexpro.com/articles/2008/05/seismic-imaging-technology-part-iv]; vol. 5, No. 5; May 2008; pp. 1-9.

Office Action in corresponding European Application No. 12 775 648.4 dated Apr. 25, 2017. (Reference D3 was previously made of record in an Information Disclosure Statement submitted on Feb. 22, 2013. Reference WO 2011/106237 as previously made of record in an Information Disclosure Statement submitted on Sep. 14, 2012.).

Office Action in corresponding European Application No. 12 775 648.4 dated Sep. 22, 2016. (Reference D3, US2010/157727A1, was submitted with an Information Disclosure Statement on Feb. 22, 2013. Reference D6, WO2011/106237A2, was submitted with an Information Disclosure Statement on Sep. 14, 2012.).

Office Action in corresponding Mexican Application No. MX/a/2014/003859 dated Sep. 28, 2017. (All references not cited herewith have been previously been made of record.).

* cited by examiner

DEPLOYMENT AND RECOVERY OF AUTONOMOUS UNDERWATER VEHICLES FOR SEISMIC SURVEY

RELATED APPLICATION

The present application is related to, and claims priority from U.S. Provisional Patent Application No. 61/541,203, filed Sep. 30, 2011, entitled "DEPLOYMENT AND RECOVERY OF AUTONOMOUS UNDERWATER VEHICLES FOR SEISMIC SURVEY," the disclosure of which is incorporated herein by reference.

BACKGROUND

Technical Field

Embodiments of the subject matter disclosed herein generally relate to methods and systems and, more particularly, to mechanisms and techniques for performing a marine seismic survey using autonomous underwater vehicles (AUVs) that carry appropriate seismic sensors.

Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration to determine the properties of earth's subsurface, which are especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional system for generating the seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to a surface 14 of the ocean. The streamers may be disposed to have other than horizontal spatial arrangements. The vessel 10 also tows a seismic source array 16 that is configured to generate a seismic wave 18. The seismic wave 18 propagates downwards toward the seafloor 20 and penetrates the seafloor until eventually a reflecting structure 22 (reflector) reflects the seismic wave. The reflected seismic wave 24 propagates upwardly until it is detected by the receiver 11 on the streamer 12. Based on the data collected by the receiver 11, an image of the subsurface is generated by further analyses of the collected data.

The seismic source array 16 includes plural individual source elements. The individual source elements may be distributed in various patterns, e.g., circular, linear, at various depths in the water. FIG. 2 shows a vessel 40 towing two cables 42 provided at respective ends with deflectors 44. Plural lead-in cables 46 are connected to streamers 50. The plural lead-in cables 46 also connect to the vessel 40. The streamers 50 are maintained at desired separations from each other by separation ropes 48. Plural individual source elements 52 are also connected to the vessel 40 and to the lead-in cables 46 via ropes 54.

However, this traditional configuration is expensive as the cost of the streamers is high. In addition, this configuration might not provide accurate results as a coupling between the seismic receivers and the seabed is poor. To overcome this last problem, new technologies deploy plural seismic sensors directly on the seabed (ocean bottom cables) to improve the coupling. Even so, positioning the seismic sensors remains a challenge.

Other technologies use permanent receivers set on the sea bottom, as disclosed in U.S. Pat. No. 6,932,185, the entire content of which is incorporated herein by reference. In this case, the seismic sensors 60 are attached, as shown in FIG. 3 (which corresponds to FIG. 4 of the patent), to a heavy pedestal 62. A station 64, which includes the sensors 60, is launched from a vessel and arrives due to its gravity, to a desired position. The station 64 remains on the bottom of the ocean permanently. Data recorded by sensors 60 are transferred through a cable 66 to a mobile station 68. When necessary, the mobile station 68 may be brought to the surface to retrieve the data.

Although this method provides a better coupling between the ocean bottom and the sensors, the method is still expensive and not flexible as the stations and corresponding sensors are left on the ocean bottom.

An improvement to this method is described, for example, in European Patent No. EP 1 217 390, the entire content of which is incorporated herein by reference. In this document, a sensor 70 (see FIG. 4) is removably attached to a pedestal 72 together with a memory device 74. After recording the seismic waves, the sensor 70 together with the memory device 74 are instructed by a vessel 76 to detach from the pedestal 72 and to surface at the ocean surface 78 to be picked up by the vessel 76.

However, this configuration is not very reliable as the mechanism maintaining the sensor 70 connected to the pedestal 72 may fail to release the sensor 70. Also, the sensor 70 and pedestal 72 may not achieve their intended positions on the bottom of the ocean. Further, the fact that the pedestals 72 are left behind contribute to ocean pollution and price increase, which are both undesirable.

Accordingly, it would be desirable to provide systems and methods that provide an inexpensive and non-polluting device for reaching the bottom of the ocean, recording seismic waves and resurfacing for data collection.

SUMMARY

According to one exemplary embodiment, there is a method for performing a marine seismic survey of a subsurface. The method includes a step of deploying under water, from a deploying vessel, an autonomous underwater vehicle (AUV); a step of recording with seismic sensors located on the AUV seismic waves generated by an acoustic source array; a step of instructing the AUV to surface at a certain depth relative to the water surface; a step of recovering the AUV by bringing the AUV on a recovery vessel; and a step of transferring recorded seismic data to the recovery vessel.

According to another exemplary embodiment, there is a method for performing a marine seismic survey of a subsurface. The method includes a step of deploying under water, from a first deploying and recovery vessel, an autonomous underwater vehicle (AUV); a step of recording with seismic sensors located on the AUV seismic waves generated by an acoustic source array; a step of instructing the AUV to surface at a predetermined depth relative to the water surface; a step of recovering the AUV by bringing the AUV on a second deploying and recovery vessel; and a step of transferring recorded seismic data to the second deploying and recovery vessel.

According to still another exemplary embodiment, there is a system for performing a marine seismic survey of a subsurface. The system includes a deploying vessel having a deploying device configured to deploy under water an autonomous underwater vehicle (AUV). The AUV includes seismic sensors and is configured to record with the seismic sensors seismic waves generated by an acoustic source array. The system further includes a recovery vessel having an acoustic system configured to instruct the AUV to surface at a certain depth relative to the water surface, and having a recovery device configured to bring the AUV on the recovery vessel; and a communication system configured to transfer recorded seismic data from the AUV to the recovery vessel.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
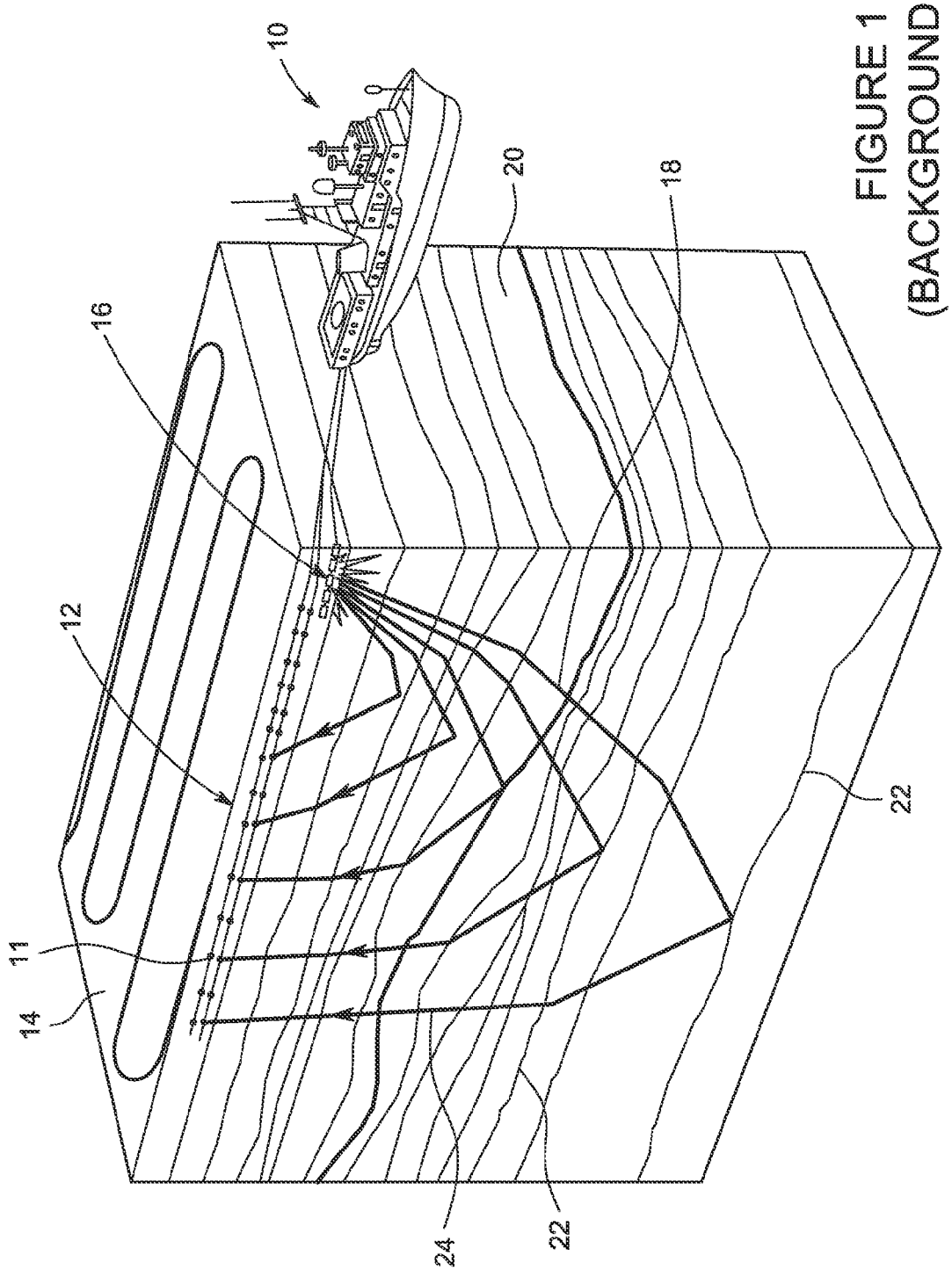
FIG. 1 is a schematic diagram of a conventional seismic survey system.
Figure 2:
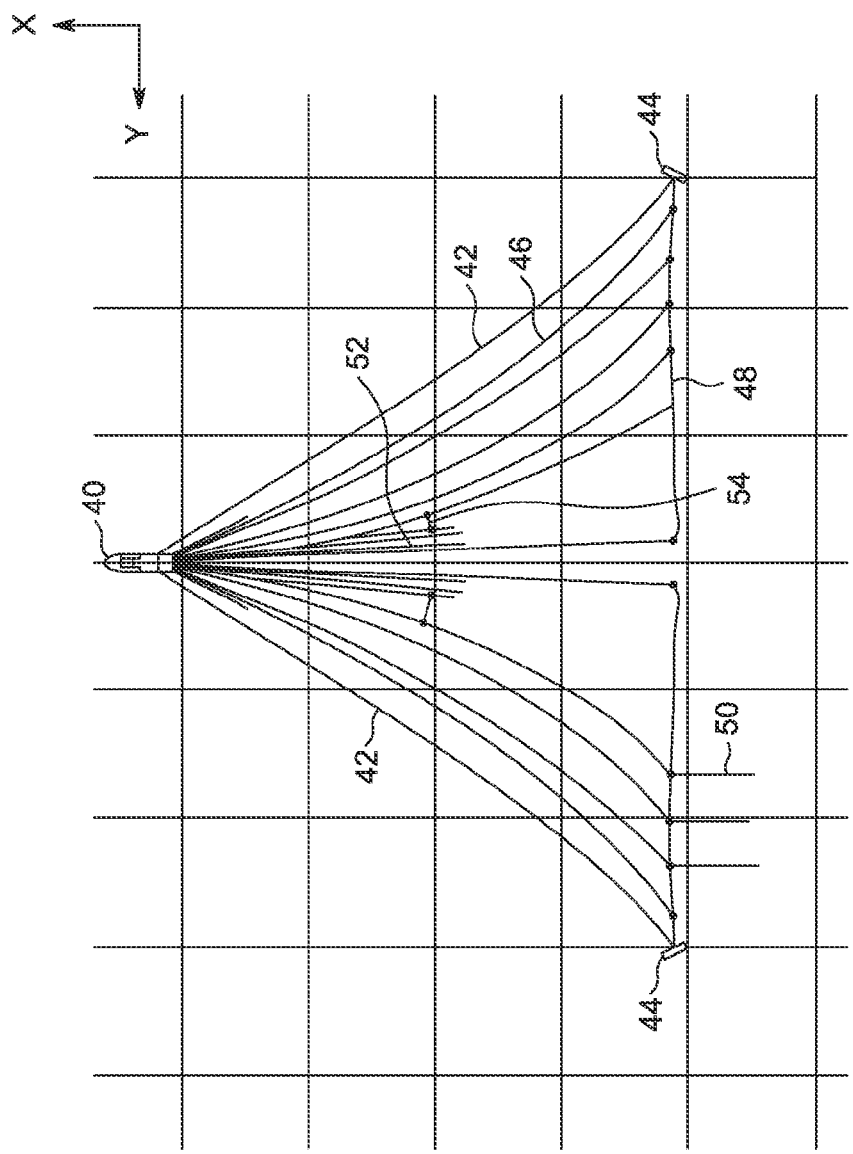
FIG. 2 illustrates a traditional arrangement of streamers and source arrays towed by a vessel.
Figure 3:
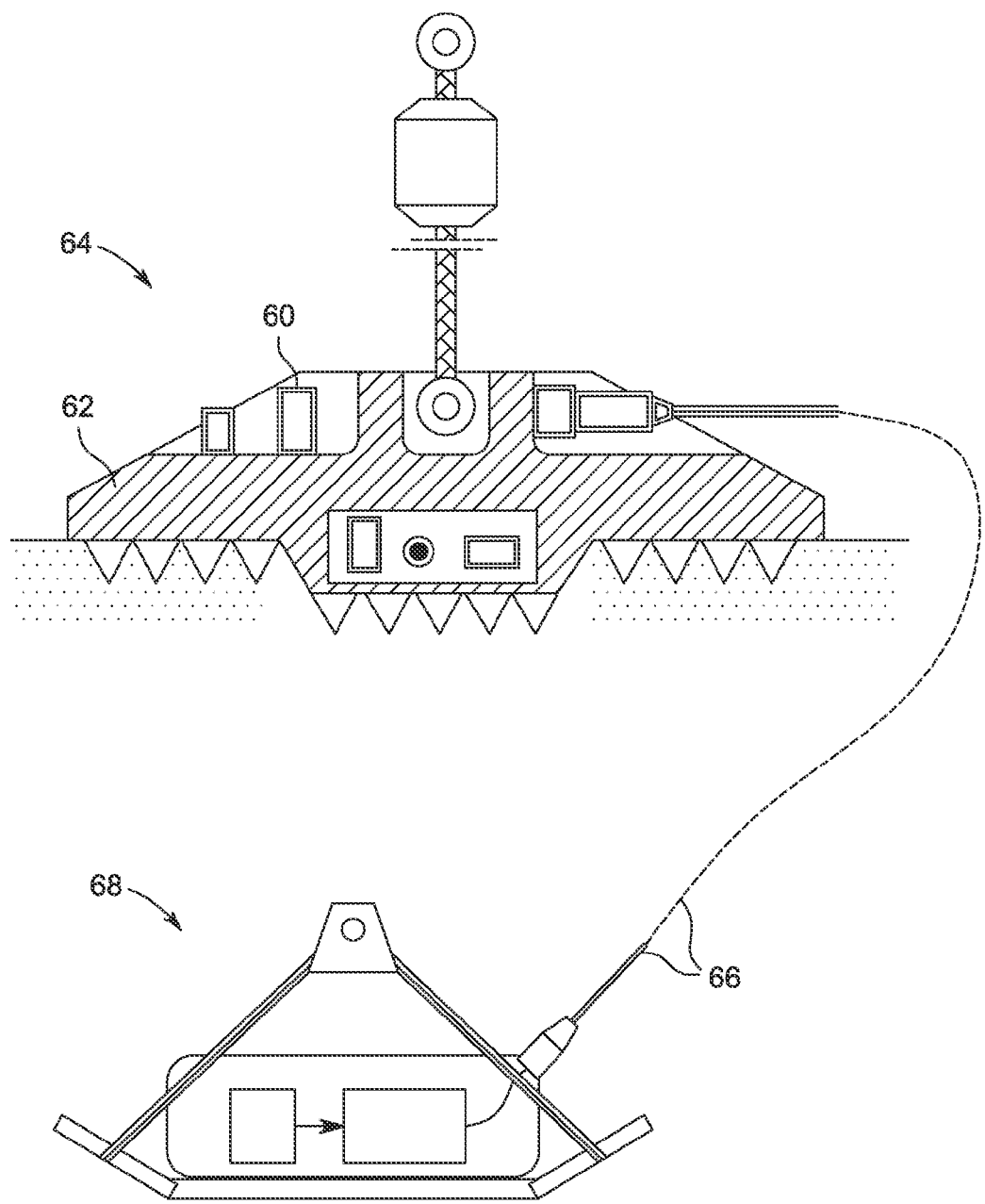
FIG. 3 is a schematic diagram of a station that may be positioned on the bottom of the ocean for seismic data recording.
Figure 4:
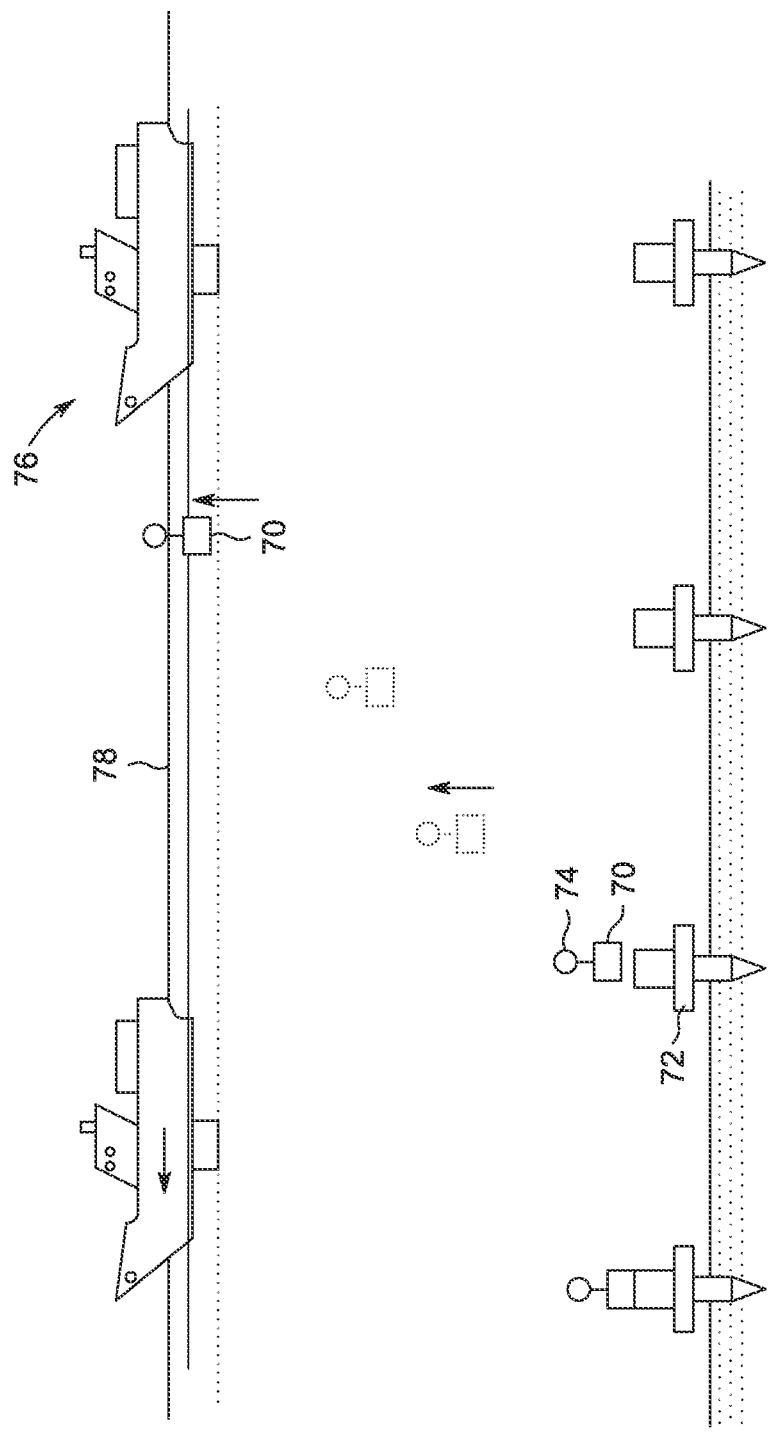
FIG. 4 is a schematic diagram of another station that may be positioned on the bottom of the ocean for seismic data recording.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an AUV having seismic sensors and being deployed from a vessel. However, the embodiments to be discussed next are not limited to AUVs being deployed from a vessel, but may be applied to other platforms, e.g., glider, that may include seismic sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need an inexpensive system for deploying and retrieving seismic receivers from the seabed. According to an exemplary embodiment, such a seismic system includes plural AUVs each having one or more seismic sensors. The seismic sensors may be one of a hydrophone, geophone, accelerometers, electromagnetic sensors, etc.

The AUV may be a specially designed device or an off-the-shelf device so that it is inexpensive. A deployment vessel stores the AUVs and launches them as necessary for the seismic survey. The AUVs find their desired positions (preprogrammed in their local control device) using, for example, an inertial navigation system.

As the deployment vessel is launching the AUVs, a shooting vessel may follow the deployment vessel for generating seismic waves. The shooting vessel may tow one or more seismic source arrays. The shooting vessel or other vessel may then instruct selected AUVs to resurface so that they can be collected. In one embodiment, the deployment vessel also tows source arrays and shoots as it deploys the AUVs. In still another exemplary embodiment, only the deployment vessel is configured to retrieve the AUVs. However, it is possible that only the shooting vessel or a dedicated recovery vessel is configured to retrieve the AUVs.

In one exemplary embodiment, the number of AUVs is in the thousands. Thus, the deployment vessel and/or the recovery vessel are configured to hold all of them at the beginning of the survey and then to launch them as the seismic survey is advancing, i.e., as the deployment and/or recovery vessels move. In other words, the deployment/recovery of the AUVs take place without stopping the deployment or the recovery vessel during the seismic survey, which is advantageous from a time duration point of view. If the shooting vessel is configured to retrieve the AUVs, when the number of available AUVs at the deployment vessel is below a predetermined threshold, the shooting vessel and the deployment vessel are instructed to switch positions in the middle of the seismic survey. Alternatively, a dedicated recovery vessel is used to recover the AUVs and the recovery vessel switches positions with the deployment vessel.

In an exemplary embodiment, the seismic survey is performed with the seismic sensors of the AUVs but also with sensors provided on streamers and towed by the deployment vessel, or the shooting vessel or by both of them.

In still another exemplary embodiment, when selected AUVs are instructed to surface, they may be programmed to go to a desired rendezvous point where they will be collected by the shooting vessel or by the deployment vessel or by the recovery vessel. The selected AUVs may be chosen to belong to a given row or column if a row and column arrangement is used. The shooting or/and deployment or/and recovery vessel may be configured to send acoustic signals to the returning AUVs for guiding them to the desired recovery position. The AUVs may be configured to go to a given altitude, execute the return back path at that altitude and then surface at a predetermined depth for being recovered. In one exemplary embodiment, the AUVs are configured to communicate among them so that they follow each other in their path back to the deployment/recovery vessel or they communicate among them to establish a queuing line for being retrieved by the shooting or deployment or recovery vessel.

Once retrieved on the vessel, the AUVs are checked for problems, their batteries may be recharged or replaced and the stored seismic data may be transferred on the vessel for processing. After this maintenance phase, the AUVs are again deployed as the seismic survey continues. Thus, in one exemplary embodiment, the AUVs are continuously deployed and retrieved. In still another exemplary embodiment, the AUVs are configured to not transmit the seismic data to the deployment or shooting or recovery vessel while the AUV is underwater. This may be advantageous as the price of the AUV increases by adding the means to communicate wireless, underwater, the seismic data. In another exemplary embodiment, each AUV has enough electric power (stored in the battery) to only be deployed, record seismic data and resurface (for example, to a predetermined depth) to be retrieved. Thus, reducing the data transmission between the AUV and the vessel while the AUV is underwater conserves the power and allows the AUV to be retrieved on the vessel before running out of electric power.

Figure 5:
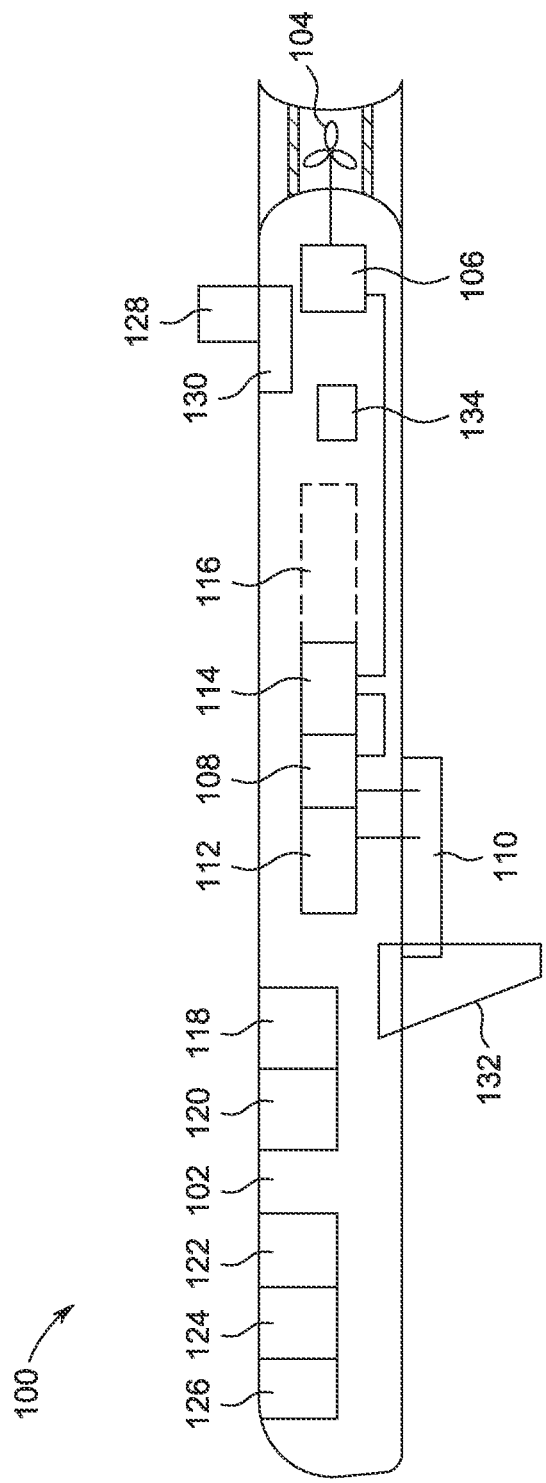
FIG. 5 is a schematic diagram of an AUV according to an exemplary embodiment.

The above-noted embodiments are now discussed in more detail with regard to the figures. FIG. 5 illustrates an AUV 100 having a body 102 to which a propeller 104 is attached. Of course, other mechanisms for propelling the AUV may be used, for example, pumping the water through a part of the AUV. A motor 106 is provided inside the body 102 for activating the propeller 104. The motor 106 may be controlled by a processor 108. The processor 108 may also be connected to a seismic sensor 110. The seismic sensor 110 may have such a shape that when the AUV lands on the ocean bottom, the seismic sensor achieves a good coupling with the sediments on the ocean bottom. In one application, the seismic sensor 110 protrudes from the body 102 of the AUV, as shown in FIG. 5. Thus, the body of the AUV is not flush in this figure. The seismic sensor may include one or more of a hydrophone, geophone, accelerometer, electromagnetic sensor, etc. For example, if a 4C (four component) survey is desired, the seismic sensor 110 includes three accelerometers and a hydrophone, i.e., a total of four sensors. Alternatively, the seismic sensor may include three geophones and a hydrophone. Of course, other combinations of sensors are possible.

A memory unit 112 may be connected to the processor 108 and/or the seismic sensor 110 for storing seismic data recorded by the seismic sensor 110. A battery 114 may be used to power up all these components. The battery 114 may be allowed to change its position along a track 116 to change a center of gravity of the AUV. A motor (not shown) may be used to achieve this function.

The AUV may also include an inertial navigation system (INS) 118 configured to guide the AUV to a desired location. An inertial navigation system includes at least a module containing accelerometers, gyroscopes, or other motion-sensing devices. The INS is initially provided with its position and velocity from another source, for example, a human operator, a GPS satellite receiver, etc., and thereafter computes its own updated position and velocity by integrating information received from its motion sensors. The advantage of an INS is that it requires no external references in order to determine its position, orientation, or velocity once it has been initialized. However, the AUV may be guided based on instructions received from the mother vessel using an acoustic transceiver and a compass or other sensors. In one embodiment, both the INS and the acoustic transceiver and compass may be used to guide the AUV to the final target.

An INS can detect a change in its geographic position (a move east or north, for example), a change in its velocity (speed and direction of movement), and a change in its orientation (rotation about an axis). It does this by measuring the linear and angular accelerations applied to the system. Thus, it requires no external reference (after initialization). However, in one application the INS is assisted by external data received from the vessel through the acoustic transceiver.

Besides the INS 118, the AUV may include a compass 120 and other sensors 122, as for example, an altimeter for measuring its depth, a pressure gauge, an interrogator module, etc. The AUV 100 may optionally include an obstacle avoidance system 124 and a wireless device/interface 126. The wireless device 126 is configured to transfer data to the vessel once the AUV is on the vessel. Wi-fi or other type of interfaces (connections) may be used to transfer the data. One or more of these elements may be linked to the processor 108. The AUV further includes an antenna 128 and a corresponding acoustic system 130 for communicating with the deployment or shooting or recovery vessel. Stabilizing fins and wings 132 for guiding the AUV to the desired position may be used. The AUV may also include a buoyancy system 134 for controlling a depth position (while moving towards the ocean surface) of the AUV if the propeller or other systems are not used or to assist the existing propelling mechanism.

The acoustic system 130 may be an Ultra-short baseline (USBL) system, also sometimes known as Super Short Base Line (SSBL). This system uses a method of underwater acoustic positioning. A complete USBL system includes a transceiver, which is mounted on a pole under a vessel, and a transponder/responder on the AUV. A processor is used to calculate a position from the ranges and bearings measured by the transceiver. For example, an acoustic pulse is transmitted by the transceiver and detected by the subsea transponder, which replies with its own acoustic pulse. This return pulse is detected by the transceiver on the vessel. The time from the transmission of the initial acoustic pulse until the reply is detected is measured by the USBL system and is converted into a range. To calculate a subsea position, the USBL calculates both a range and an angle from the transceiver to the subsea AUV. Angles are measured by the transceiver, which contains an array of transducers. The transceiver head normally contains three or more transducers separated by a baseline of, e.g., 10 cm or less.

Figure 6:
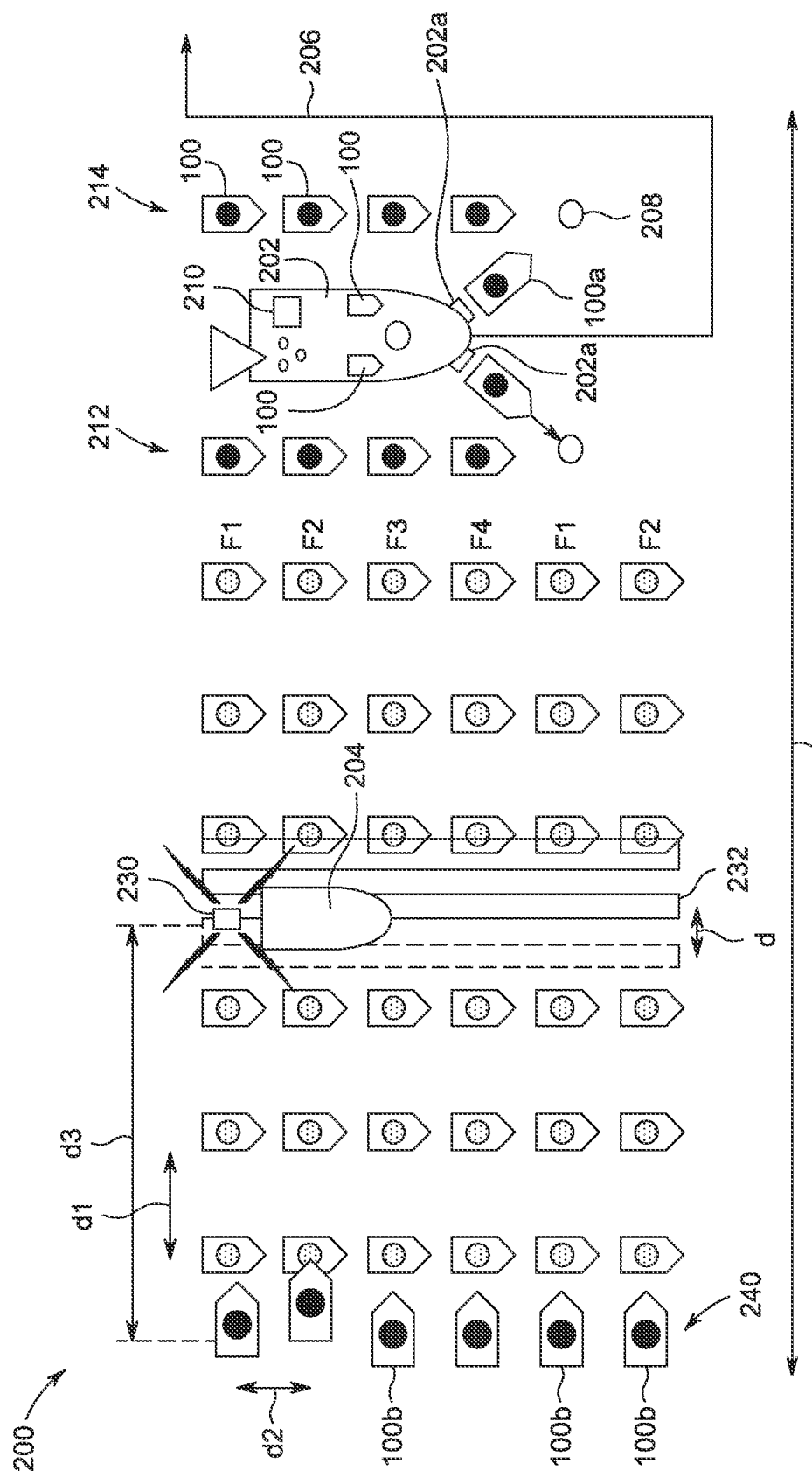
FIG. 6 is a schematic illustration of a configuration for deploying and recovering AUVs according to an exemplary embodiment.

FIG. 6 illustrates an exemplary embodiment in which a seismic survey system 200 includes a deployment vessel 202 and a shooting vessel 204. The deployment vessel 202 follows a predefined path 206. For example, the predefined path 206 may be as shown in the figure, i.e., following straight lines. In another application, the path may be circular or having a different shape. The deployment vessel 202 is loaded with AUVs 100. In one application, around 2000 AUVs are used for performing the seismic survey. While the deployment vessel 202 may be configured to hold all these AUVs, at any given time, the deployment vessel holds less than the total number of AUVs. Those skilled in the art would recognize that various numbers of AUVs may be used for any given seismic survey.

The deployment vessel 202 may include, for example, one or more launching devices 202a on which the AUVs 100 are loaded prior to being launched into the sea. The launching devices 202a may have a certain inclination relative to the surface of the water to provide an initial speed to the AUVs. In one application, a position and inclination of the launching devices 202a may be adjusted relative to the deployment vessel so that the launched AUV has its initial velocity pointing to the final destination. It is noted that the act of launching an AUV takes places while the vessel travels with a predetermined speed. In another words, there is no need to stop the vessel to launch an AUV. The same is true about recovering the AUVs. For example, FIG. 6 shows an AUV 100a being launched toward its final destination 208. Thus, a central controller 210 located on the deployment vessel 202 may optionally be configured to continuously calculate the position of the launching devices 202a relative to the desired positions 208 and to adjust accordingly the launching devices before launching the AUVs 100.

FIG. 6 shows for simplicity two columns 212 and 214 of AUVs being launched simultaneously or sequentially from the deployment vessel 202. Of course, the deployment vessel may be configured to launch only one column per path 206 or more than two columns. In the embodiment illustrated in this figure, the AUVs are launched to be distributed on columns and rows. Other distributions are also possible, circular patterns.

The shooting vessel 204 may tow one or more source arrays 230 that are configured to generate acoustic waves. The source array may include one or more air guns, water guns or other impulsive devices. In one embodiment, the source array may include elements configured to generate electromagnetic waves.

The shooting vessel 204 follows its own path 232. Depending on the distance between the rows of AUVs, the shooting vessel's path 232 may make multiple loops between two consecutive rows of AUVs. For example, a distance d between two consecutive passes of the shooting vessel 204 may be in the order of 50 m. According to another example, a distance d1 between consecutive columns of AUVs may be around 300 m and a distance d2 between consecutive lines of AUVs may be around 50 m. Of course, other values are possible depending on the survey, the goals of the survey and the cost of the survey. Also, a total distance D for the entire seismic system 200 may be in the order of kilometers, for example, 10 to 20 km.

While the shooting vessel 204 follows the predetermined path 232, it shoots its source array and the seismic receivers of the AUVs record seismic data. After the shooting vessel 204 has sailed away from selected AUVs 100b, for example, with a predetermined distance d3, the shooting vessel 204 or another vessel instructs the AUVs 100b to return to the deployment vessel 202. In one application, the source array is configured to send a coded signal so that only the selected AUVs 100b are instructed to go back to the deployment vessel. In this application, the hydrophone of each AUV 100b is configured to receive the coded signal and the corresponding processor of the AUV is configured to identify the code and instruct the motor to drive the AUV back to the deployment vessel. It is noted that other AUVs are not affected by the coded message so that they remain on the bottom of the ocean to still record seismic waves. In other words, each or groups of AUVs may be configured to react to given codes.

An example of such system is an acoustic underwater positioning and navigation (AUPN) system. The AUPN system may exhibit high accuracy and long range performance in both positioning and telemetry modes. These features are obtained due to the automatic beam forming transducers which focuses the sensitivity towards its targets or transponders. This beam can not only be pointed in any direction below the vessel, but also horizontally and even upwards to the surface as the transducer has the shape of a sphere.

Thus, AUPN may be a hydro-acoustic Super Short Base Line (SSBL) or USBL, tow tracking system, able to operate in shallow and deepwater areas to proven ranges in excess of 3000 meters. It is a multi-purpose system used for a wide range of applications including towfish and towed platform tracking, high accuracy subsea positioning and telemetry and scientific research.

The AUPN is used to determine the landing AUV position. In one embodiment, the actual AUV's position is measured with the AUPN, while the AUV is still moving, and the position is then provided to the AUV, while moving to its desired position, to correct its INS trajectory. It is noted that there are various possible implementations of the AUPN.

The retrieval of the AUVs 100b may be achieved in at least two ways. A first way, as illustrated in FIG. 6, is to instruct at least one row 240 of AUVs to return to the deployment vessel 202. As the AUVs 100b are instructed to return along their own column (the shortest route), the AUVs 100b will intersect the path 232 of the shooting vessel as they return to the deployment vessel.

When they arrive at the deployment vessel 202, the AUVs 100b may surface or position to a given depth so that the deployment vessel 202 can retrieve them (in other words, the catcher of the vessel may have an end at the water surface or at a certain depth in the water). Once retrieved, the AUV enter inside the deployment vessel and technicians have access to the data stored in the AUV but also to the various components of the AUVs. For example, the technician or a robot may replace the depleted battery of the AUVs or may recharge is necessary. Also, the technician or a robot may inspect or/and may run tests on the AUVs. The wi-fi system may be activated to transfer the seismic data from the AUVs to the vessel. Once on the deployment vessel, the AUV is extracted from the sea, i.e., it is physically located inside the vessel. Once the data has been removed from the AUV and its battery has been changed, recharged or tested that has enough electric power, the AUV may be again deployed on the launching device 202a to continue the seismic survey.

Figure 7:
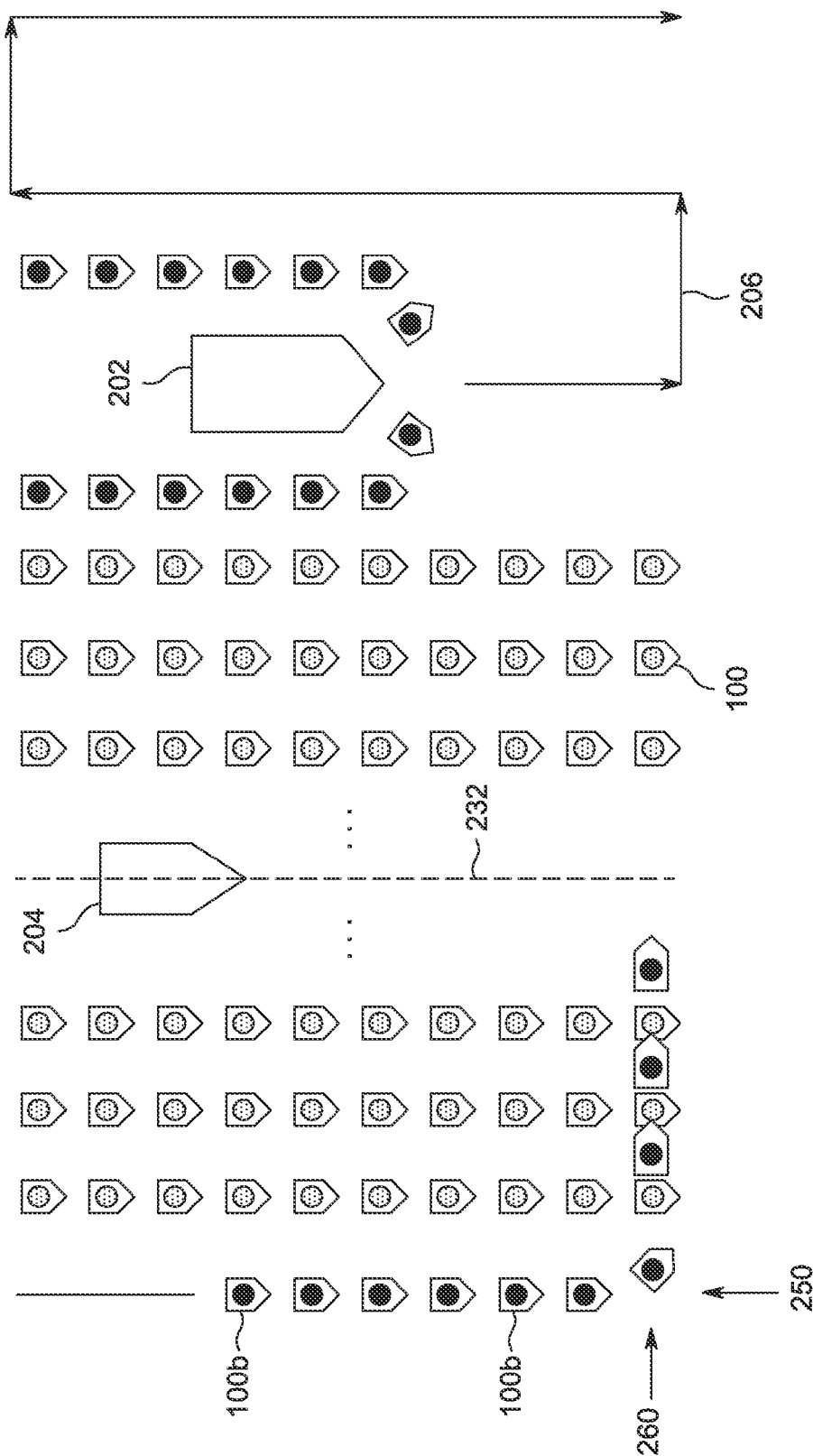
FIG. 7 is a schematic illustration of another configuration for deploying and recovering AUVs according to an exemplary embodiment.

According to an exemplary embodiment illustrated in FIG. 7, the selected AUVs 100b may be instructed to follow the column 250 and then the row 260 for reaching a position close to the deployment vessel 202. In this way, it is less likely that the returning AUVs will intersect with the shooting vessel 204. In this configuration, the AUVs are less likely to be affected by the air gun.

Figure 8:
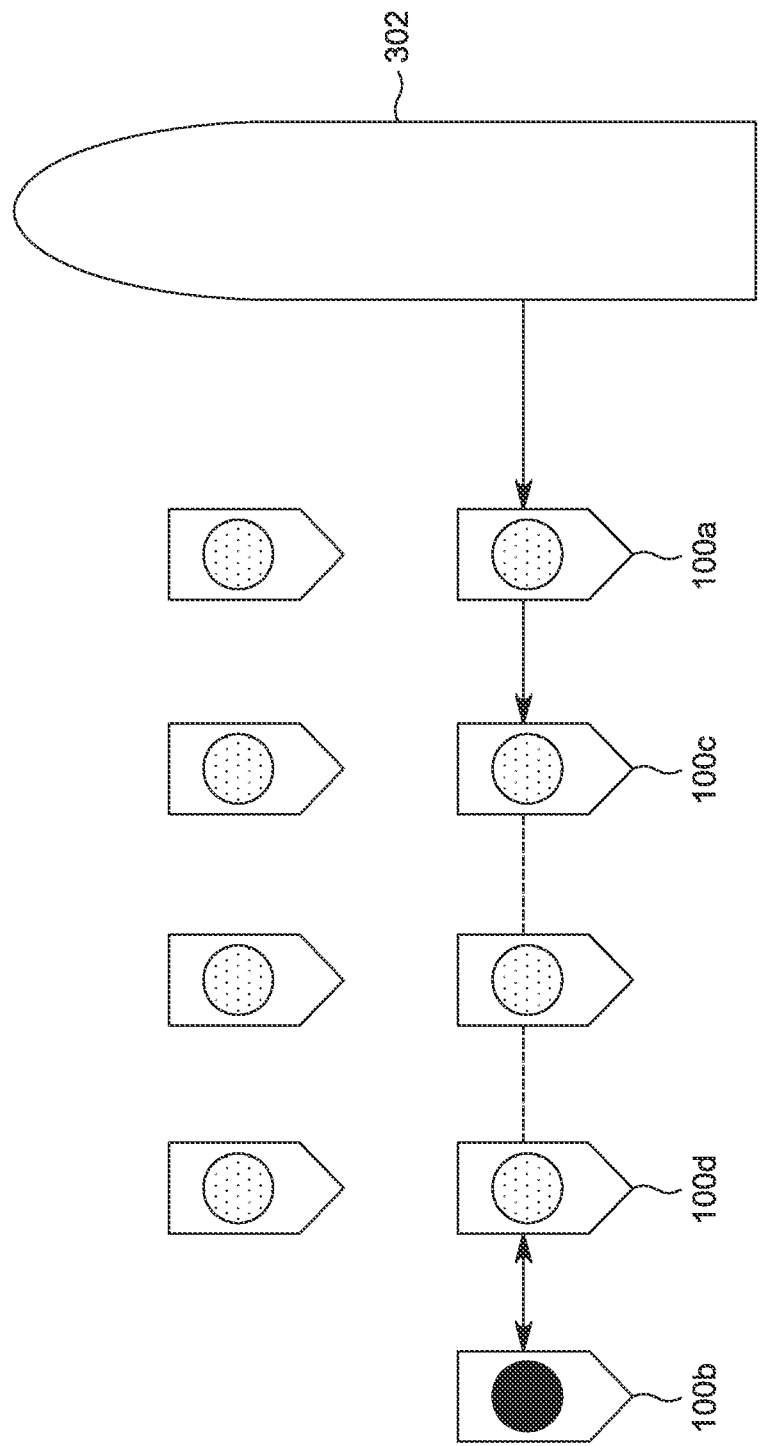
FIG. 8 is a schematic illustration of plural AUVs that communicate among themselves according to an exemplary embodiment.

In one exemplary embodiment, each AUV may communicate with neighbor AUVs and may form a queue for being retrieved in an orderly fashion by the deployment vessel. Once close to the deployment vessel, the AUV may also communicate with the deployment vessel for deciding which device is first retrieved. Also, the communication between AUVs may be used by one AUV to ask neighbors AUVs about a position of the deployment or recovery vessel. In other words, as shown in FIG. 8, AUV 100a that is in proximity of the deployment or recovery vessel 302, may transmit the position of the vessel along the retrieving AUVs 100c-d to one of the farthest AUV 100b so that this last AUV can correct its trajectory accordingly. In one embodiment, the AUV 100b is configured to interrogate adjacent AUVs about the position of the deployment or recovery vessel. To achieve this communication, each of the AUVs may have a corresponding modem element that forms together with other modem elements a modem communication system between the AUVs. Alternatively, the AUVs may have USBL beacons having different frequencies, e.g., F1 to F4 as shown in FIG. 6. These beacons may be used by the traveling AUVs to arrive at the deployment or recovery vessel.

Figure 9:
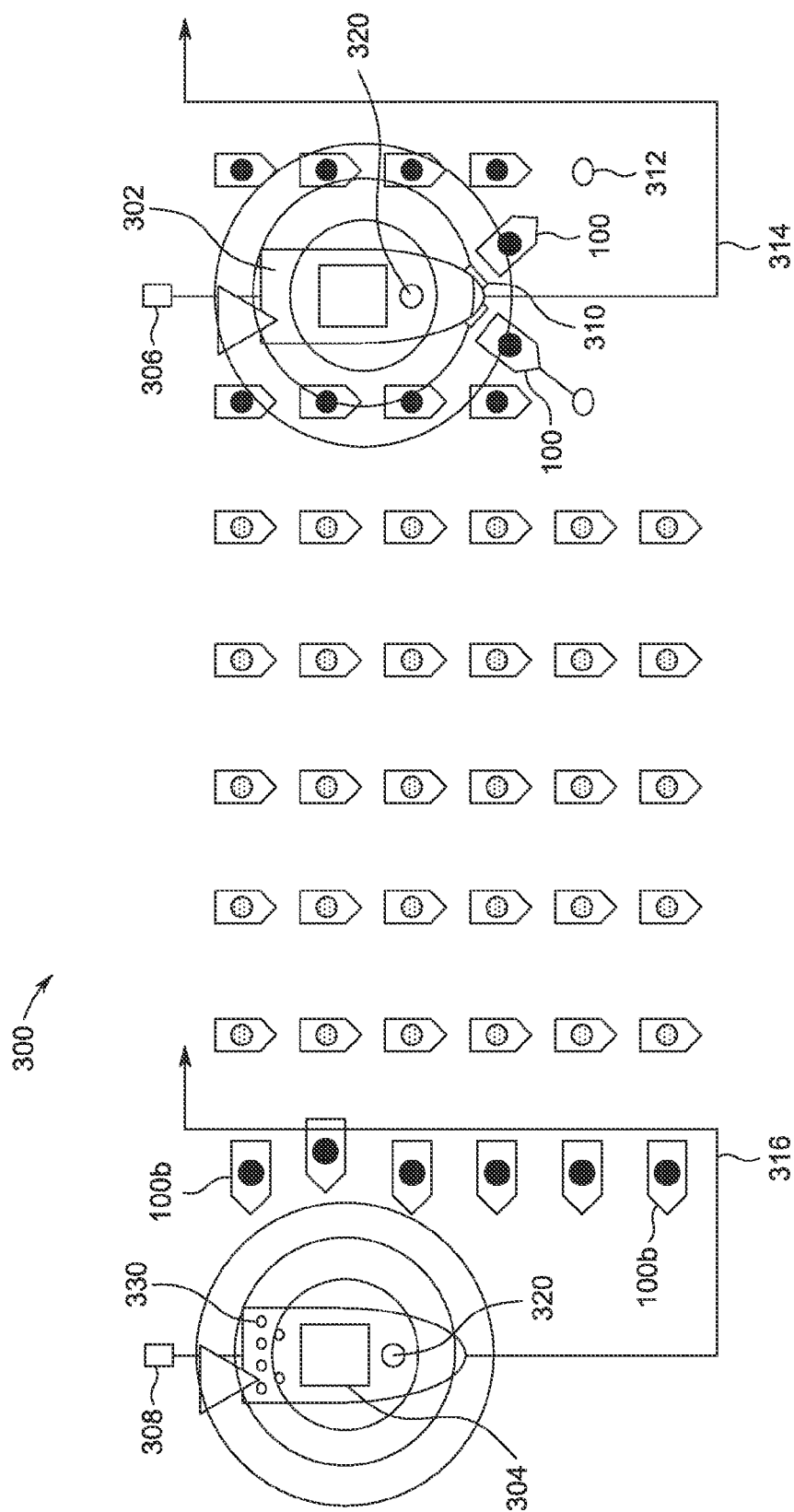
FIG. 9 is a schematic illustration of still another configuration for deploying and recovering AUVs according to an exemplary embodiment.

According to another exemplary embodiment, the AUVs may be launched similar to the embodiment illustrated in FIG. 6 but may be retrieved differently, as illustrated in the embodiment of FIG. 9. In this embodiment, a seismic system 300 includes a deployment vessel 302 and a recovery vessel 304. Each vessel may include a source array 306 and 308, respectively and thus, both vessels act as shooting vessels. The deployment vessel 302 is configured to launch the AUVs 100 toward desired positions 312 by using launching devices 310 as discussed in FIG. 6.

The two vessels 302 and 304 may be configured to shoot their source arrays simultaneously, nearly simultaneously or according to a flip-flop mode as know in the art. The deployment vessel 302 follows its own path 314 while the recovery vessel 304 also follows its own path 316. The two paths 314 and 316 may coincide. While the deployment vessel 302 deploys the AUVs the recovery vessel 304 retrieves the AUVs. Thus, when instructed, selected AUVs 100b forming a column or more are instructed to approach the recovery vessel 304. In this way, the AUVs 100b do not have to travel a long distance as the recovery vessel is close by. Once the deployment vessel 302 runs low on stored AUVs, the deployment vessel 302 switches its position with the recovery vessel 304 so that the seismic survey continues uninterrupted.

Distances between the columns and lines of AUV and also an overall distance of the seismic survey are similar to those discussed in FIG. 6, which correspond to a sparse columns/dense rows arrangement. Other arrangements are possible, as for example, a dense columns/sparse rows arrangement in which d1 is about 50 m, and d2 is about 300 m, or a sparse columns/sparse rows arrangement in which both d1 and d2 are about 300 m. Other numbers are possible as will be appreciated by those skilled in the art. It is noted that the AUVs discussed above can easily go to a depth of 300 m.

However, for the exemplary embodiment illustrated in FIG. 9, as the AUVs are close to the recovery vessel, it is not necessary to encode the signal generated by the source arrays. Instead, an AUPN system may be used. This system 320 is provided on each of vessels. The same system may be provided on the vessels shown in the embodiment of FIG. 6.

In the embodiments illustrated in FIGS. 6 to 9, the vessels may have a system 330 of synchronous pingers configured to determine the position of the returned AUV. In this way, for example, the deployment vessel knows the position of the AUV that needs to be retrieved and can instruct the AUV to change its location to a new location that corresponds to a caching mechanism provided on the deployment vessel. In another exemplary embodiment, there are synchronous pingers configured to determine a relative position of the AUV compared to a catcher of the vessel. This data is calculated in the AUV as the catcher does not know where the AUVs are. In other words, the AUV determines where the catcher is and changes its direction in order to position itself in the course of the catcher when the cacher arrives, so that the AUV is retrieved on the vessel.

Figure 10:
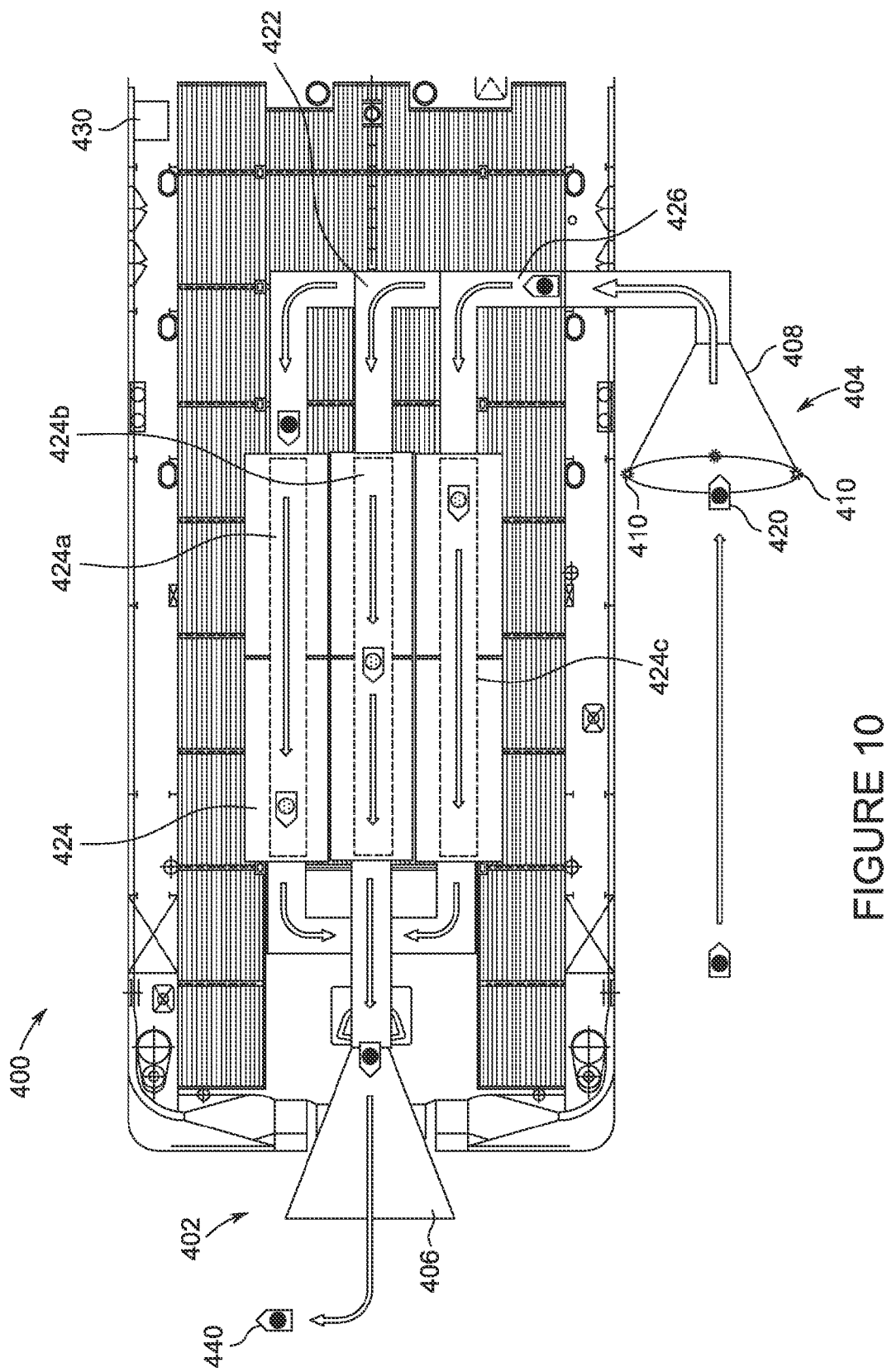
FIG. 10 is a schematic illustration of a vessel for recovering and deploying AUVs according to an exemplary embodiment.

The above-noted processes for deploying and retrieving AUVs may be implemented according to an exemplary embodiment illustrated in FIG. 10. A vessel 400 includes a deploying mechanism 402 and a recovery mechanism 404. Both the deploying and recovery mechanisms may include a corresponding chute 406 or 408. Considering the recovery mechanism 404, the chute 408 may have a funnel shape and may be deployed under water or at the surface of the water. One or more beacons 410 may be located on a rim of the chute 408 for directing a AUV 420 inside the chute. After entering the chute 408, the AUV 420 may engage a conveyor belt mechanism 422 or another hooking mechanism. The conveyor belt mechanism 422 may be configured to take the AUV 420 to a maintenance area 424. The maintenance area, inside the vessel 400, may have one or more parallel tracks 424a-c that split from a main track 426. Each track 424a-c takes corresponding AUVs 420 to appropriate maintenance locations.

At the maintenance locations, operators or robots may change the battery of the AUV, if depleted, and also may remove the memory unit of the AUV that stores the recorded seismic data. A new memory unit may be provided to the AUV. In an alternative embodiment, the memory is connected to a vessel memory unit 430 through a cable or a wi-fi interface and the data is transferred from the AUV's memory unit to the vessel's memory unit 430.

A throughput of this system is equal to the minimum of the throughputs of the different steps of the operation (recovery, maintenance, deployment). Assuming that all the AUVs are following the same path at a constant speed, they may arrive at the vessel with a separation equal to the time needed to travel the distance separating them initially.

Once the maintenance phase is over, the AUVs 440 having fresh or recharged batteries and memory units with enough available space may be provided to the deploying mechanism 402 for deployment. Thus, a vessel 400 having the mechanisms noted above may, at the same time, retrieve AUVs 420 and deploy AUVs 440 for implementing the seismic surveys discussed with reference to FIGS. 6-9. Those skilled in the art would recognize that numerous modifications may be implemented for recovering and deploying AUVs and those shown in the attached figures are for exemplary purposes.

Figure 11:
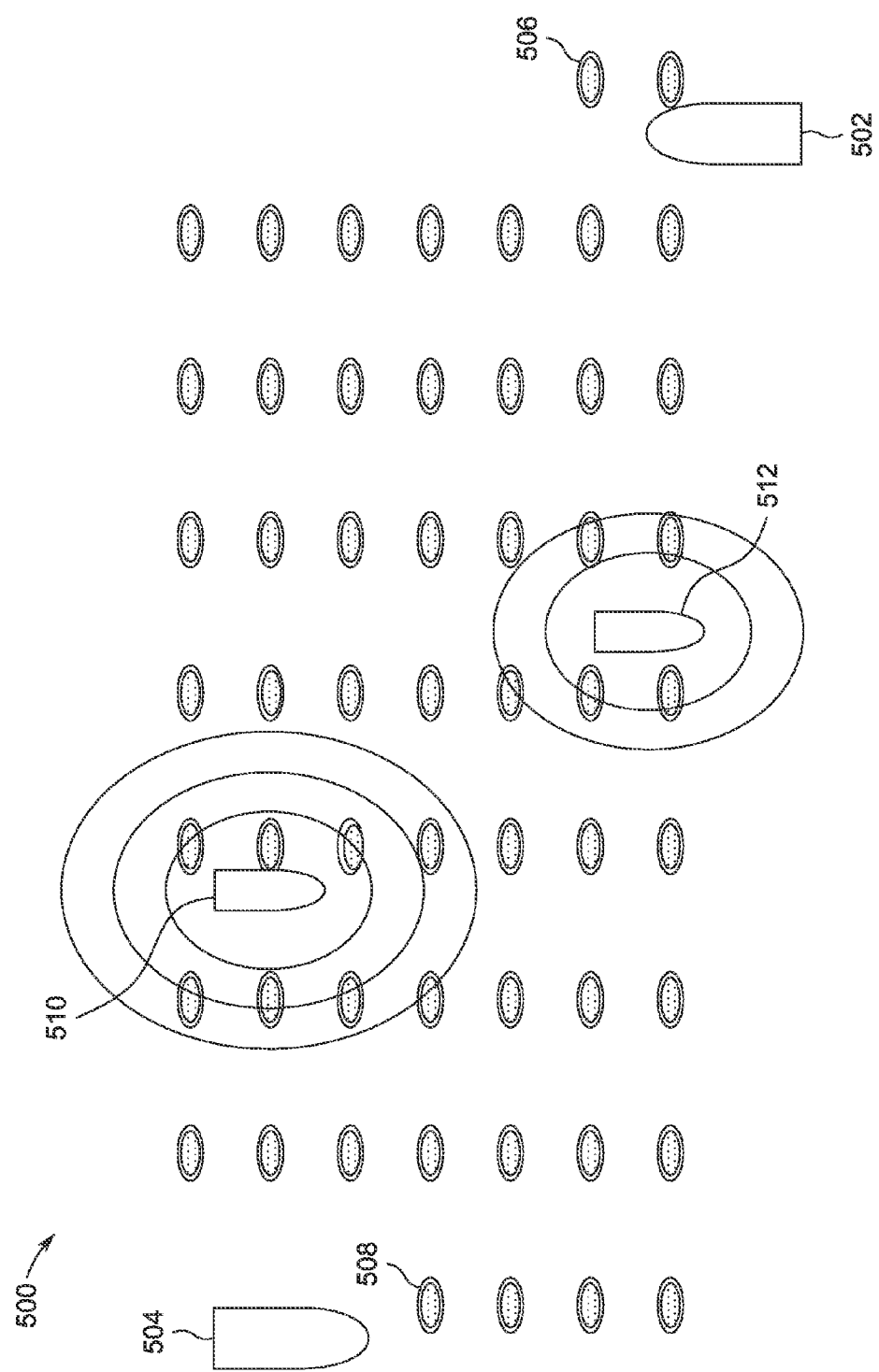
FIG. 11 is a schematic illustration of yet another configuration for deploying and recovering AUVs according to an exemplary embodiment.

Another embodiment for deploying and recovering AUVs is now discussed with regard to FIG. 11. FIG. 11 shows a seismic system 500 that includes a deployment vessel 502 and a recovery vessel 504. The deployment vessel 502 is tasked to deploy AUVs 506 while the recovery vessel 504 is tasked to recover AUVs 508. In this embodiment, dedicated shooting vessels 510 and 512 follow their own path and generate acoustic waves. In one application, the deployment and recovery vessels do not tow source arrays. In another application, the deployment vessel launches only one row of AUVs at a time and the recovery vessel recovers only one row of AUVs at a time. Although FIG. 11 shows two shooting vessels, those skilled in the art would appreciate that one or more than two shooting vessels may be used. In another application, the deployment and recovery vessels operate continuously. When the deployment vessel is empty, it swaps positions with the recovery vessel. The shooting of the sources may continue while the deployment and recovery vessels swap positions. Thus, a deployment vessel is also configured to be a recovery vessel and the other way around.

The deploying and recovery processes discussed above are just some examples for illustrating the novel concepts of using AUVs for seismic data recording. Those skilled in the art would appreciate that these processes may be changed, adjusted, or modified to fit various needs.

Figure 12:
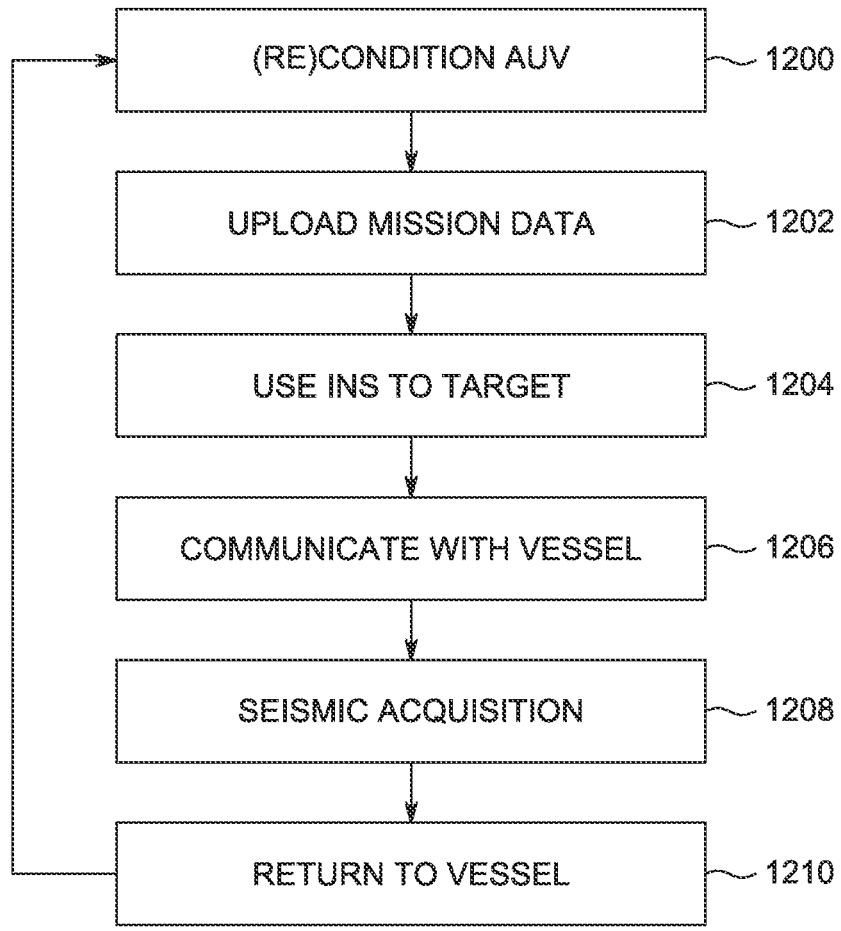
FIG. 12 is a flowchart of a method for deploying and recovering AUV according to an exemplary embodiment.

A method for deploying and recovering the AUVs is now discussed with regard to the flowchart presented in FIG. 12. In step 1200, the AUV is prepared for launching. This preparation phase, i.e., conditioning if the AUV is launch for the first time or reconditioning if the AUV is recycled, may include one or more of charging the batteries, downloading seismic data, checking the system, etc.

In the next step 1202, the mission data for that specific AUV is loaded in its processor. This may be happening while the AUV is on the deck of the vessel or the AUV is already loaded in its launching tube or ramp or both. The mission data may include the present position of the AUV, the final desired position on the bottom of the ocean, and other parameters. After this, the AUV is launched in step 1204. The AUV is configured to use its INS (or acoustic communication) and the uploaded mission data to travel to its final destination. In one application, the AUV does not receive any information from the vessel while travelling. However, in another application, the AUV may receive additional information from the vessel, for example, its current position as measured by the AUPN of the vessel. In still another application, beacons may be used to guide the AUV. In still another application, some of the already deployed AUV may function as beacons.

In step 1206, after the AUV has settled to the seabed (i.e., when the AUV just landed or after, until the AUV is retrieved), the vessel interrogates the AUV about its position. The AUV replies with a reference beam to the AUPN of the vessel and the vessel determined the position of the AUV. The position of the AUV may be determined with an accuracy of, for example, +/−2 m when the AUV is at a depth not larger than 300 m.

After this step, the AUV is ready to record seismic signals in step 1208. This process may last as long as necessary. In one application, after the shooting vessel has triggered its source arrays in a predetermined vicinity of the AUV, the AUV is instructed in step 1210, for example, using the AUPN of the vessel to wake-up and start resurfacing. During this step the AUV starts its motor and moves towards the recovery vessel. It is noted that the AUV can move in the direction of the recovery catcher, but the relative speed will be high, so the AUV may also move in the same direction as the vessel, but slower, so that the relative speed is more reasonable, and the AUV can actively position itself to be catched by the catcher. In one application, the recovery vessel is the same with the deployment vessel. The AUV is helped to arrive at the recovery vessel by acoustic signals emitted by the recovery vessel. Once the AUV arrives at the recovery vessel, the AUV engages the recovery unit (e.g., chute) of the recovery vessel and the AUV is handled to arrive on the deck of the vessel for reconditioning as described in step 1200. The AUV may also be delivered under the deck of the recovery vessel for the reconditioning (maintenance) phase. Then, the whole process may be repeated so that the AUVs are constantly reused undersea for the seismic survey.

Figure 13:
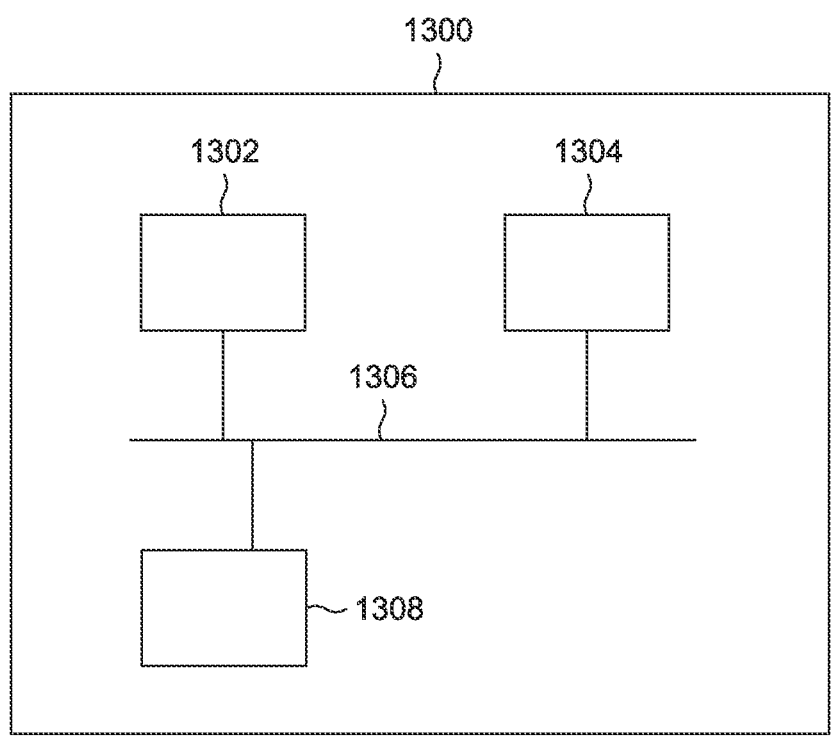
FIG. 13 is a schematic diagram of a controller.

With regard to the local and/or central controllers discussed above, a possible configuration of such a device is schematically illustrated in FIG. 13. Such a controller 1300 includes a processor 1302 and a storage device 1304 that communicate together via a bus 1306. An input/output interface 1308 also communicates with the bus 1306 and allows an operator to communicate with the processor or the memory, for example, to input software instructions for operating the AUPN of the vessel, or the INS of the AUV, etc. The input/output interface 1308 may also be used by the controller to communicate with other controllers or interfaces that are provided on the vessel. For example, the input/output interface 1308 may communicate with a GPS system (not shown) for acquiring the actual position of the AUV at launch time or with an acoustical system. The controller 1300 may be a computer, a server, a processor or dedicated circuitry.

One or more of the exemplary embodiments discussed above disclose a method for deploying and recovering AUV configured to perform seismic recordings. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for performing a marine seismic survey of a subsurface, the method comprising:
    deploying under water, from a deploying vessel, an autonomous underwater vehicle (AUV);
    recording with seismic sensors located on the AUV seismic waves generated by an acoustic source array;
    instructing the AUV to surface at a certain depth relative to the water surface;
    recovering the AUV by bringing the AUV on a recovery vessel; and
    transferring recorded seismic data to the recovery vessel.

2. The method of claim 1, further comprising:
    measuring and recording a position of the AUV after landing on the ocean bottom.

3. The method of claim 2, wherein an acoustic underwater positioning and navigation (AUPN) system is used to measure the position of the AUV.

4. The method of claim 3, further comprising:
    sending from the AUPN system a wake-up signal to the AUV to resurface.

5. The method of claim 1, further comprising:
    towing with a shooting vessel at least a source array; and
    shooting the source array for generating the seismic waves.

6. The method of claim 1, further comprising:
    preparing the AUV on the recovery vessel for a next launch.

7. The method of claim 6, wherein the step of preparing further comprises:
  replacing or charging a battery of the AUV;
  transferring the recorded data to the recovery vessel through a connection; and
  checking the AUV.

8. The method of claim 6, further comprising:
  uploading new mission data on the AUV for the next deployment.

9. The method of claim 1, further comprising:
  swapping positions of the recovery vessel with the deployment vessel to continue the seismic survey.

10. A method for performing a marine seismic survey of a subsurface, the method comprising:
  deploying under water, from a first deploying and recovery vessel, an autonomous underwater vehicle (AUV);
  recording with seismic sensors located on the AUV seismic waves generated by an acoustic source array;
  instructing the AUV to surface at a predetermined depth relative to the water surface;
  recovering the AUV by bringing the AUV on a second deploying and recovery vessel; and
  transferring recorded seismic data to the second deploying and recovery vessel.

11. The method of claim 10, further comprising:
  measuring the position of the AUV with an acoustic underwater positioning and navigation (AUPN) system.

12. The method of claim 11, further comprising:
  sending from the AUPN system a wake-up signal to the AUV to resurface.

13. The method of claim 10, further comprising:
  towing with a shooting vessel at least a source array; and
  shooting the source array for generating the seismic waves.

14. The method of claim 10, further comprising:
  preparing the AUV on the recovery vessel for a next launch.

15. The method of claim 14, wherein the step of preparing further comprises:
  replacing or charging a battery of the AUV;
  transferring the recorded data to the recovery vessel through a connection; and
  checking the AUV.

16. The method of claim 14, further comprising:
  uploading new mission data on the AUV for the next deployment.

17. The method of claim 10, further comprising:
  swapping positions of the recovery vessel with the deployment vessel to continue the seismic survey.

18. A system for performing a marine seismic survey of a subsurface, the system comprising:
  a deploying vessel having a deploying device configured to deploy under water an autonomous underwater vehicle (AUV);
  the AUV includes seismic sensors and is configured to record with the seismic sensors seismic waves generated by an acoustic source array;
  a recovery vessel having an acoustic system configured to instruct the AUV to surface at a certain depth relative to the water surface, and having a recovery device configured to bring the AUV on the recovery vessel; and
  a communication system configured to transfer recorded seismic data from the AUV to the recovery vessel.

19. The system of claim 18, further comprising:
  an acoustic underwater positioning and navigation (AUPN) system configured to measure a position of the AUV.

20. The system of claim 19, wherein AUPN system is configured to send a wake-up signal to the AUV to resurface.

* * * * *